US009952067B2

(12) United States Patent
Sanzari

(10) Patent No.: US 9,952,067 B2
(45) Date of Patent: Apr. 24, 2018

(54) SYSTEMS AND METHODS FOR OPTICAL MEASUREMENTS USING MULTIPLE BEAM INTERFEROMETRIC SENSORS

(71) Applicant: KULITE SEMICONDUCTOR PRODUCTS, INC., Leonia, NJ (US)

(72) Inventor: Martin A. Sanzari, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 156 days.

(21) Appl. No.: 14/705,585

(22) Filed: May 6, 2015

(65) Prior Publication Data
US 2016/0327414 A1 Nov. 10, 2016

(51) Int. Cl.
*G01D 5/353* (2006.01)
*G01D 5/26* (2006.01)
*G01L 9/00* (2006.01)

(52) U.S. Cl.
CPC ......... *G01D 5/35312* (2013.01); *G01D 5/266* (2013.01); *G01L 9/0079* (2013.01)

(58) Field of Classification Search
CPC G01D 5/35312; G01B 9/0207; G01B 11/161; G01B 2290/25; G01B 2290/60
See application file for complete search history.

(56) References Cited

U.S. PATENT DOCUMENTS 4,825,262 A 4/1989 Mallinson
5,345,519 A * 9/1994 Lu .................. G01D 5/266
250/227.11
5,392,117 A 2/1995 Belleville et al.
5,629,757 A * 5/1997 Sakata .................. G01B 11/18
356/35.5
5,844,667 A 12/1998 Maron
5,907,403 A 5/1999 Andrews et al.
6,278,811 B1 8/2001 Hay et al.
(Continued)

OTHER PUBLICATIONS

Co-pending U.S. Appl. No. 14/989,901, filed Jan. 7, 2016, entitled "Thermally Stable High Temperature Pressure and Acceleration Optical Interferometric Sensors".

*Primary Examiner* — Hwa Lee
(74) *Attorney, Agent, or Firm* — Troutman Sanders LLP; James E. Schutz; Mark Lehi Jones

(57) ABSTRACT

The disclosed technology may include systems, methods, and apparatus for optical measurements. A method is provided that includes receiving, by first and second Extrinsic Fabry-Perot Interferometer (EFPI) sensors, respective portions of interrogation light. The first EFPI sensor is responsive to a measurement stimulus and both the first EFPI sensor and the second EFPI sensor are responsive to a common mode stimulus. The method includes detecting a measurement signal and a first common-mode signal responsive to receiving altered interrogation light from the first EFPI sensor, the measurement signal corresponding to the measurement stimulus. The method includes detecting a second common mode signal responsive to receiving altered light from the second EFPI sensor. The method includes producing a measurement output signal, the measurement output signal representing a difference between the second common mode signal and a combination of the measurement signal and the first common-mode signal, and outputting the measurement output signal.

19 Claims, 7 Drawing Sheets

(56) References Cited

U.S. PATENT DOCUMENTS

| | | | |
|---|---|---|---|
| 6,281,976 B1 | 8/2001 | Taylor et al. | |
| 6,422,084 B1 | 7/2002 | Fernald et al. | |
| 6,563,970 B1 | 5/2003 | Bohnert et al. | |
| 6,671,055 B1 * | 12/2003 | Wavering | G02B 6/29398 356/478 |
| 6,776,045 B2 | 8/2004 | Fernald et al. | |
| 6,925,213 B2 | 8/2005 | Boyd et al. | |
| 7,091,472 B1 | 8/2006 | Millar | |
| 7,308,162 B2 | 12/2007 | Wang | |
| 7,423,762 B2 | 9/2008 | Schmidt | |
| 7,458,273 B2 | 12/2008 | Skinner et al. | |
| 7,492,463 B2 | 2/2009 | Lopushansky et al. | |
| 7,684,656 B2 | 3/2010 | Chen | |
| 7,796,843 B2 | 9/2010 | Song et al. | |
| 8,096,704 B2 | 1/2012 | Riza et al. | |
| 8,115,937 B2 | 2/2012 | Needham | |
| 8,180,185 B2 | 5/2012 | Xia et al. | |
| 8,218,916 B2 | 7/2012 | Chen | |
| 8,264,692 B2 | 9/2012 | Hall | |
| 8,298,227 B2 | 10/2012 | Leo et al. | |
| 8,330,096 B2 | 12/2012 | Goldner et al. | |
| 8,405,822 B2 | 3/2013 | Gunther et al. | |
| 8,567,265 B2 | 10/2013 | Aeby et al. | |
| 8,764,678 B2 | 7/2014 | Bremer et al. | |
| 9,078,706 B2 | 7/2015 | Kirschman | |
| 2003/0112443 A1 * | 6/2003 | Hjelme | G01N 21/45 356/480 |
| 2005/0088660 A1 * | 4/2005 | Ronnekleiv | G01B 9/02007 356/478 |
| 2005/0231730 A1 * | 10/2005 | Jeffers | G01B 9/02007 356/480 |
| 2011/0170116 A1 | 7/2011 | Homa et al. | |
| 2011/0228279 A1 | 9/2011 | Lucey | |

\* cited by examiner

SYSTEMS AND METHODS FOR OPTICAL MEASUREMENTS USING MULTIPLE BEAM INTERFEROMETRIC SENSORS

FIELD

Example implementations of the disclosed technology relate to measurements using multiple beam interferometric sensors, and in particular to systems and methods for reducing measurement errors associated with Extrinsic Fabry-Perot Interferometer sensors.

BACKGROUND

Extrinsic Fabry-Perot Interferometer (EFPI) sensors can be used to measure environmental phenomena such as temperature, pressure, acceleration, etc., by coupling the EFPI sensor to the desired environment. For example, a diaphragm within the sensor may be used to physically couple external pressure changes to a reflective surface of an optical fiber within the EFPI cavity. By interrogating the cavity with light, a signal may be generated that corresponds to the external pressure changes. Thus, the retrieved signals from these sensors typically correspond to optical interference fringe intensity variations corresponding to the measured phenomena as the sensor is subjected to environmental changes.

Among the challenges faced in making such measurements with an EFPI sensor is that fluctuations of other parameters in the system can result in measurement errors. For example, fluctuations in the light source intensity can affect the signal. Furthermore, spurious reflections from fusion joints in the optical fiber, changes in the index of refraction of the fiber as a function temperature, stress induced changes resulting from the expansion and contraction of the optical fiber and its mating materials as a function of temperature, mismatches in the coefficient of thermal expansion of mating materials, etc., can further influence the measurement. A need exists to reduce or eliminate measurement errors.

SUMMARY

Some or all of the above needs may be addressed by certain implementations of the disclosed technology. Certain implementations may include systems, methods and apparatus for measuring a desired stimulus while rejecting, or otherwise factoring out unwanted signals.

Certain example embodiments of the disclosed technology can include a method that may include receiving, by a first Extrinsic Fabry-Perot Interferometer (EFPI) sensor, a first portion of interrogation light, wherein the first EFPI sensor is configured to alter the received first portion of the interrogation light responsive to a measurement stimulus. The method includes receiving, by a second EFPI sensor, a second portion of the interrogation light. The second EFPI sensor is configured to be at least partially isolated from the measurement stimulus. The first EFPI sensor and the second EFPI sensor are both configured to alter the respective first and second portions of the interrogation light responsive to a common mode stimulus. The method includes detecting, by a first optical detector, a measurement signal and a first common-mode signal responsive to receiving altered interrogation light from the first EFPI sensor, the measurement signal corresponding to the measurement stimulus. The method includes detecting, by a second optical detector, a second common mode signal responsive to receiving altered light from the second EFPI sensor, producing a measurement output signal, the measurement output signal representing a difference between the second common mode signal and a combination of the measurement signal and the first common-mode signal, and outputting the measurement output signal.

According to another example implementation, a system is provided. The system can include a first Extrinsic Fabry-Perot Interferometer (EFPI) sensor configured to receive a first portion of interrogation light, the first EFPI sensor further configured to alter the first portion of the received interrogation light responsive to a measurement stimulus and a common mode stimulus in communication with the system. The system includes a second EFPI sensor configured to be at least partially isolated from the measurement stimulus, the second EFPI sensor configured to receive a second portion of the interrogation light, the second EFPI sensor further configured to alter the second portion of the received interrogation light responsive to the common mode stimulus. The system includes a first optical detector configured to receive altered light from the first EFPI and to produce a combined measurement signal and first common-mode signal responsive to receiving the altered light from the first EFPI, the measurement signal corresponding to the measurement stimulus. The system may further include a second optical detector configured to receive altered light from the second EFPI and to produce a second common mode signal responsive to receiving the altered light from the second EFPI. The system may further include at least one electronic component configured to produce a measurement output signal, the measurement output signal comprising a difference between the second common mode signal and the combined measurement signal and first common-mode signal.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

The disclosed technology includes multiple-beam optical measurement systems that utilize extrinsic Fabry-Perot type interferometric (EFPI) sensors for calibrating and/or measuring stimuli such as temperature, pressure, acceleration, etc. The signals generated by the EFPI sensors may be in the form of a variation in optical interference fringe intensity as the sensors are subjected to the stimuli.

Some of the challenges encountered in using the EFPI sensors include the presence of unwanted signal fluctuations due to various parameters associated with the system and the measurement environment. For example, signal errors from unwanted fluctuations can stem from variations in the intensity (and/or wavelength) of the system's light source(s), spurious reflections (for example, from fusion splice joints in optical fibers), changes in the index of refraction of the optical fiber as a function temperature, stress induced changes resulting from the expansion and contraction of the optical fiber and its mating materials as a function of temperature, mismatches in the coefficient of thermal expansion of mating materials, etc. Such fluctuations can cause errors in the measurement signals. Certain example implementations of the disclosed technology may be utilized to reduce, subtract out, and/or eliminate such unwanted fluctuations. The disclosed system provides a means for removing errors through a unique error measurement system and calibration scheme.

Figure 1:
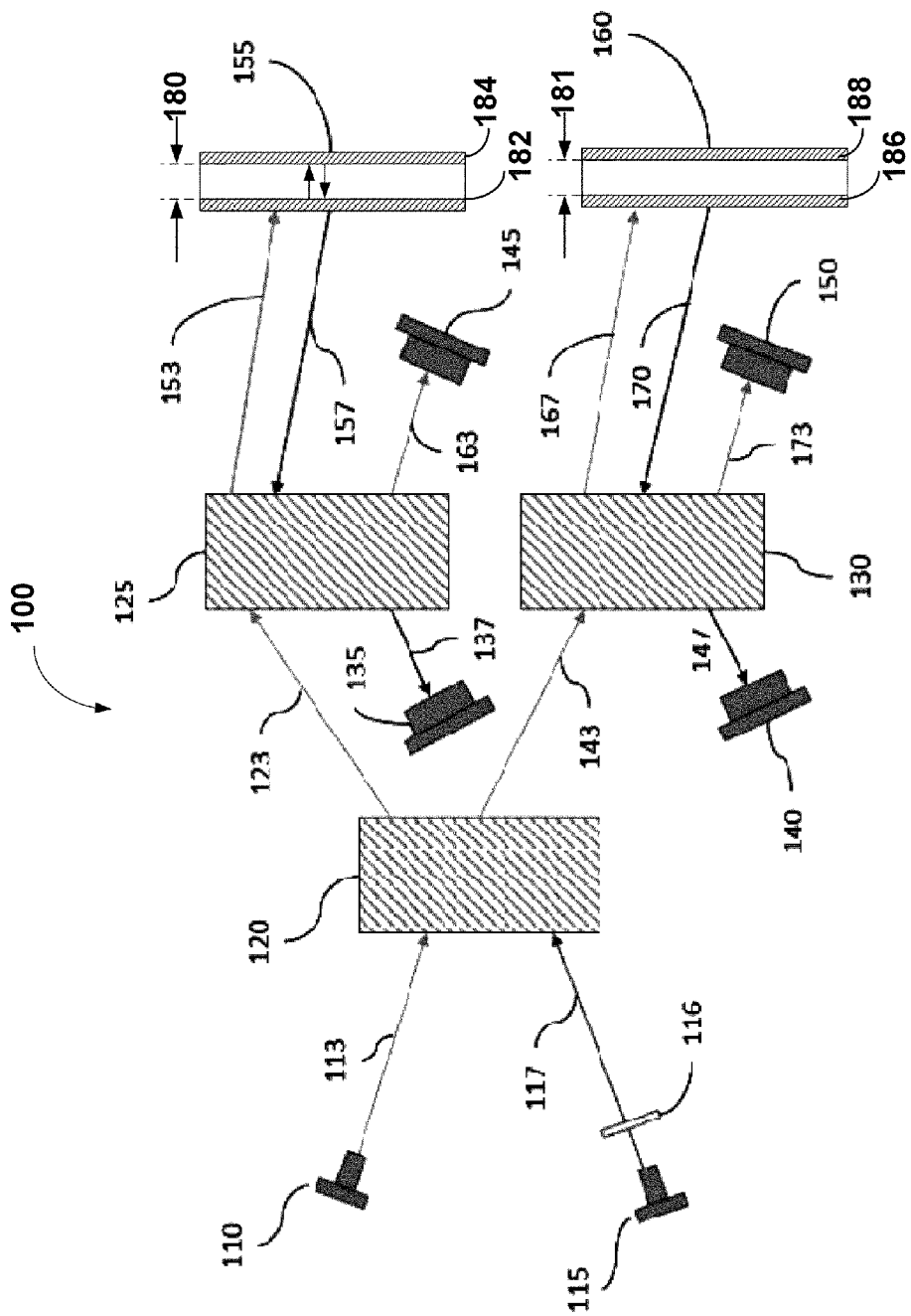
FIG. 1 is an illustrative block diagram of a multiple-beam Extrinsic Fabry-Perot Interferometer (EFPI) sensor system 100, according to an example implementation.

FIG. 1 is an illustrative block diagram of a multiple-beam Extrinsic Fabry-Perot Interferometer (EFPI) sensor system 100, according to an example implementation of the disclosed technology. In certain embodiments, the system 100 can include two extrinsic Fabry-Perot interferometer (EFPI) sensors 155 160. These EFPI sensors 155 160 may be utilized to measure temperature, pressure, acceleration, etc. As may be understood by those having skill in the art, the first EFPI sensor 155 may include an optical cavity defined by a first (partially) reflective surface 182 and at least a second reflective surface 184, where the second reflective surface 184 is separated by a respective cavity length 180 from the first reflective surface 182. Similarly, the second EFPI sensor 160 may include an optical cavity defined by a first (partially) reflective surface 186 and at least a second reflective surface 188, where the second reflective surface 188 is separated by a respective cavity length 181 from the first reflective surface 186.

The cavity lengths 180 181 of the respective sensors 155 160 need not be the same, although they can be.

In accordance with certain example implementations of the disclosed technology, and with reference to FIG. 1, the following terms, system components, and reference numeral designations may be utilized throughout the specification. Certain example implementations may include all of the following components, while other example implementations may include one or more of the following components: first light source 110; first wavelength $\lambda_1$ (associated with the first light source 110); first coherence length $l_1$ (associated with the first light source 110), first optical coupler 120, second optical coupler 125, third optical coupler 130; second light source 115; second wavelength $\lambda_2$ (associated with the second light source 115); second coherence length $l_2$ (associated with the second light source 115); first EFPI sensor 155; first reflective surface 182 (associated with the first EFPI sensor 155); second reflective surface 184 (associated with the first EFPI sensor 155); first cavity length 180 (associated with the first EFPI sensor 155); second EFPI sensor 160; third reflective surface 186 (associated with the second EFPI sensor 160); fourth reflective surface 188 (associated with the second EFPI sensor 160); second cavity length 181 (associated with the second EFPI sensor 160); first optical detector 135 second optical detector 145; third optical detector 140; and fourth optical detector 150. In addition, certain example implementations of the disclosed technology may be described in terms of the following optical beams or paths: first path 113; second path 117; third path 123; fourth path 143; fifth path 153; sixth path 157; seventh path 167; eighth path 170; ninth path 137; tenth path 163; eleventh path 147; and twelfth path 173. In certain example implementations, one or more of the paths listed above may comprise optical fiber for directing the light therein. In other example implementations, one or more of paths listed above may be free space.

The general operation of the EFPI sensors 155 160 will now explained in simple terms with reference to the first EFPI sensor 155. In certain example implementations, interrogating light may be introduced into the optical cavity of the EFPI sensor 155, for example, via an optical fiber 153 associated with the system 100, and through the first (partially transmissive, partially) reflective surface 182 associated with the EFPI sensor 155. The light introduced into the cavity may traverse the cavity length 180, reflect from the second reflective surface 184, traverse back through the cavity, back through the first (partially) reflective surface 182, and back into the optical fiber 157 (where, in certain embodiments, the optical fibers 153 157 may comprise the same optical fiber). By virtue of the two reflective surfaces 182 184 that form the cavity, the interrogating light may experience multiple reflections within the cavity, and the resulting "self-interference" may cause constructive and destructive interference in the light reflected back into the system 100, for example, as a function of the cavity length 180, the refractive index of the cavity, and the wavelength(s) present in the interrogating light.

In accordance with an example implementation of the disclosed technology, the second reflective surface 184 of the first EFPI sensor 155 may be coupled, for example, to a diaphragm (not shown) such that the desired measurement stimuli (acceleration, pressure, temperature, etc.) may deflect the diaphragm, and, in-turn, may vary the effective cavity length 180 of the first EFPI sensor 155. In this manner, and according to an example implementation, a signal corresponding to this interference pattern may be detected to provide a measurement of the stimuli.

As indicated above, the measurement signal may include unwanted signal fluctuations due to temperature, etc. Certain example implementations of the disclosed technology may utilize the second EFPI sensor 160 (and isolated from the desired measurement stimuli) to subtract common, but unwanted signal fluctuations experienced by both EFPI sensors 155 160. For example, in one embodiment, the second EFPI sensor 160 may be mechanically isolated from the diaphragm (as described above), but may be thermally coupled to the measurement environment in a similar manner as the first EFPI sensor 155, so that common temperature affects, as experienced by both sensors, may be subtracted out of the measurement signal, or otherwise compensated. Furthermore, certain example implementations of the disclosed technology provide for compensation of fluctuations in the light sources and other components of the system 100, and will be explained below with reference to FIGS. 1-5.

With continued reference to FIG. 1, and in accordance with an example implementation of the disclosed technology, the system 100 may include two light sources 110 115 to provide light to the system 100 for interaction with the various sensors and detectors. In an example implementation, the two light sources 110 115 may emit light at different wavelengths. In certain example implementations, the light sources 110 115 may be selectively and independently controlled. For example, in one implementation, the light sources 110 115 may be turned on and off independently. In addition, an in accordance with another implementation, the intensity of the light sources 110 115 may be controlled, for example, via feedback (as will be explained with reference to FIG. 5). In certain example implementations, the light sources 110 115 may comprise a light emitting diode (LED). In other example implementations, the light sources 110 115 may comprise laser diodes. In some implementations, the light sources 110 115 may include super luminescent LEDs (SLEDs). In yet other example implementations, the light sources 110 115 may include gas lasers, filtered light sources, and/or other types of light sources as known in the art.

In certain implementations, the system 100 may include one or more optical couplers. For example, in certain example implementations, the system 100 can include three 2×2 optical couplers 120 125 130, for example, to split and direct the light from one of more of the light sources 110 115 to one or more of the EFPI sensors 155 160 and/or one or more of the photodetectors 135 140 145 150. According to an example implementation of the disclosed technology, the photodetectors 135 140 145 150 may include antireflection coatings to reduce or eliminate any light reflection back into the system 100.

Certain example implementations of the disclosed technology may utilize certain coherence control components 116, such as optically frosted or ground glass, for altering the coherence length associated with one or more of the light sources 110 115. For example, insertion of a coherence control component 116 in the path of a light beam may reduce the coherence length associated with the light path, for example, to help reduce unwanted measurement signals that may arise due to self-interference, and as will be readily understood by those having skill in the art. As will be further explained below, such coherence control components 116 may be inserted (or removed) to extend (or reduce) the coherence length of a given optical signal to accommodate certain path lengths associated with the system 100.

Again, with continued reference to FIG. 1, the light in the various depicted light paths 113, 117, 123, 143, 153, 157, 167, 137, 167, 170, 147, 173 may be assumed to be traveling in either a single mode or multimode optical fiber. In certain example implementations, the light depicted traveling in the first forward light path (for example, the fifth path 153) and the light depicted traveling in the first reverse light path (for example, the sixth path 157) may be traveling the same optical fiber. Additionally, the light depicted traveling in the second forward light path (for example, the seventh path 167) and the light depicted traveling in the second reverse light path (for example, the eighth path 170) may be traveling the same optical fiber.

In accordance with an example implementation of the disclosed technology, the EFPI sensors 155 160, in response to the incoming interrogation light, may generate an optical interference fringe pattern whose intensity changes as a function of environmentally-influenced cavity changes (such as temperature, pressure, acceleration, etc.) that are experienced by the sensors 155 160. In certain example implementations in which the one or more light sources 110 115 comprise a light emitting diode (LED), such a light source may be considered to be "broadband," and the resulting interference pattern may exist if the coherence length of the corresponding light source is longer than the round trip spacing 180 between the reflective surfaces 182 184 associated with the corresponding EFPI sensor 155 and 160. Certain example implementations of the disclosed technology may utilize (and control) this feature, as will be explained further below, and as indicated above with respect to the discussion of the coherence control component 116.

Figure 2:
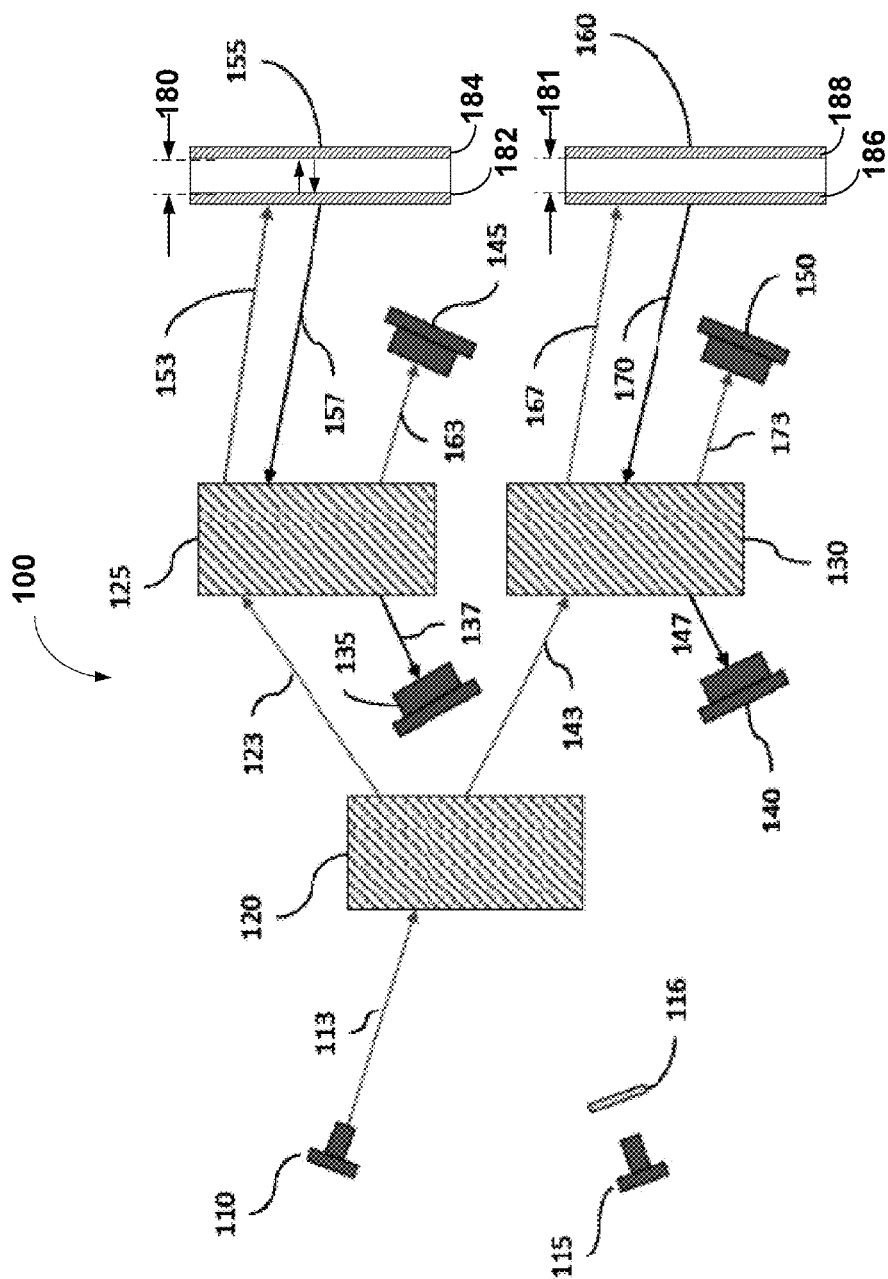
FIG. 2 is an illustrative block diagram of the EFPI sensor system 100 (as shown in FIG. 1) with a first light source 110 turned on and a second light source 115 turned off to allow monitoring of light fluctuations of the first light source 110 during the measurement process, in accordance with an example implementation of the disclosed technology.

FIG. 2 depicts the system 100 (as shown in FIG. 1) with the first light source 110 turned on, and the second light source 115 turned off. In this example, light from the first light source 110 propagates via a first path 113 into the first optical coupler 120 and may be divided into a third light path 123 and a fourth light path 143. Light from the third light path 123 may enter the second optical coupler 125 and may be divided into a fifth path 153 and a tenth light path 163. In an example implementation, the light in the tenth light path 163 may travel to and be detected by a second optical detector 145. The light intensity signal measured by the second optical detector 145 may be used to monitor light fluctuations originating from the first light source 110 during the measurement process.

In accordance with an example implementation of the disclosed technology, light in the fifth path 153 may continue to the first EFPI sensor 155. In an example implementation, the coherence length of the first light source 110 may be chosen, set, or adjusted to have a first coherence length $l_1$ that is longer than twice the first cavity length 180 (or spacing) between the first reflective surface 182 and second reflective surface 184 associated with the first EFPI sensor 155. As known to those having skill in the art, coherence length may be influenced by various factors associated with the respective light source, and is related to the Full Width at Half Maximum of the wavelength spread (or bandwidth) of the light source. In certain example implementations, the coherence length $l_1$ associated with the first light source 110 may be chosen, set, or adjusted to ensure that an optical interference pattern is generated on the light in the sixth path 157 exiting the first EFPI sensor 155.

In accordance with an example implementation of the disclosed technology, the light in the sixth path 157 may include an optical interference pattern that may be modified by the environmental changes resulting from temperature changes experienced by the first EFPI sensor 155. This light may enter the second optical coupler 125 and may be directed such that light in the ninth path 137 impinges on the first optical detector 135. In accordance with an example implementation of the disclosed technology, the optical inference pattern intensity may be registered at the first optical detector 135, and may be represented as $I_{135}^{110}(\delta t_{21})$.

According to an example implementation of the disclosed technology, intensity changes that occur at the first light source 110 during the measurement process may be registered at the second optical detector 145, and may be represented as $I_{145}^{110}(\delta t_{21})$. In an example implementation, a percentage change of the intensity at the second optical detector 145 may be represented as $\Delta_\%\{l_{145}^{110}(\delta t_{21})\}$ and can be applied to the intensity measurement $l_{135}^{110}(\delta t_{21})$ at the first optical detector 135 to normalize the signal to account for the first light source 110 intensity fluctuations.

Concurrently, and in accordance with an example implementation, light in the fourth path 143 that originated from the first light source 110 and exited the first optical coupler 120 (at the same time as light beam 123), may enter the third optical coupler 130. In an example implementation, the third optical coupler 130 may divide this incoming light such that half (or a portion thereof) continues to the second EFPI sensor 160 and the other half (or the remaining portion thereof) enters and is detected by the forth optical detector 150. In accordance with an example implementation of the disclosed technology, the light intensity signal measured at the fourth optical photodetector may be represented as 150 $l_{150}^{110}(\delta t_{21})$ and may be used to monitor light fluctuations originating at the first light source 110 during the measurement process.

In an example implementation, light in path 167 may continue into the second EFPI sensor 160. As previously described, the first coherence length $l_1$ of the first light source 110 is chosen, selected, or adjusted such that it is longer than twice the effective second cavity length 181 (or spacing) between the third reflective surface 186 an fourth reflective surface 188 of the second EFPI sensor 160. This ensures that an optical interference pattern is generated on the light in the eighth path 170 exiting the second EFPI sensor 160. As previously described, the light in the eighth path 170 may include an optical interference pattern that is modified by the environmental changes resulting from temperature and pressure/acceleration changes experienced by the second sensor 160. In an example implementation, light in the eighth path 170 may enter the third optical coupler 130 and may be directed such that light in the eleventh path 147 impinges on the third optical detector 140. The optical inference pattern intensity registered at the third optical detector 140 may be represented as $l_{140}^{110}(\delta t_{21})$.

In an example implementation, intensity changes that occur at the first light source 110 during the measurement process may be registered at the fourth optical detector 150. The percentage change of the intensity at the fourth optical detector 150 may be represented as $\Delta_\%\{l_{150}^{110}(\delta t_{21})\}$ and can be applied to the intensity measurement at the third optical detector 140 to account for (or normalize out) the first light source 110 intensity fluctuations.

In accordance with an example implementation of the disclosed technology, by taking measures to isolate the first EFPI sensor 135 from the desired environment stimulus (pressure, acceleration, etc.) while exposing the second EFPI sensor 160 to such stimulus (while both the first EFPI sensor and the second EFPI sensor are thermally coupled), temperature-induced errors may be subtracted from the resulting signal. For example, the fringe intensity recorded at the first optical detector 135 may represent a temperature measurement experienced by the first EFPI sensor 155. In certain example implementations, this signal may be adjusted for light intensity fluctuations from the first light source 110. The resulting signal may be subtracted from the intensity recorded at the third optical detector 140 after its intensity is adjusted for fluctuations in the first light source 110, resulting in the expression:

$$\Delta\{l_{140/135}^{110}(\delta t_{21})\} = l_{140}^{110}(\delta t_{21})*[1+\Delta_\%\{l_{150}^{110}(\delta t_{21})\}] - l_{135}^{110}(\delta t_{21})*[1+\Delta_\%\{l_{145}^{110}(\delta t_{21})\}].$$

In accordance with an example implementation of the disclosed technology, the intensity recorded at the third optical detector 140 may represent the effects of temperature and pressure/acceleration from the second EFPI sensor 160. With both the first EFPI sensor 155 and the second EFPI sensor 160 physically located next to each other (thermally coupled), subtracting the intensity measurement at the first optical detector 135 from the third optical detector 140 may effectively remove temperature-induced measurements from the system 100 and may result in the measured changes in pressure/acceleration as experienced by the second EFPI sensor 160. Therefore the relative pressure change is proportional to $\Delta\{l_{140/135}^{110}(\delta t_{21})\}$ and may be represented as:

$$p_{rel} \propto \Delta\{l_{140/135}^{110}(\delta t_{21})\}.$$

Figure 3:
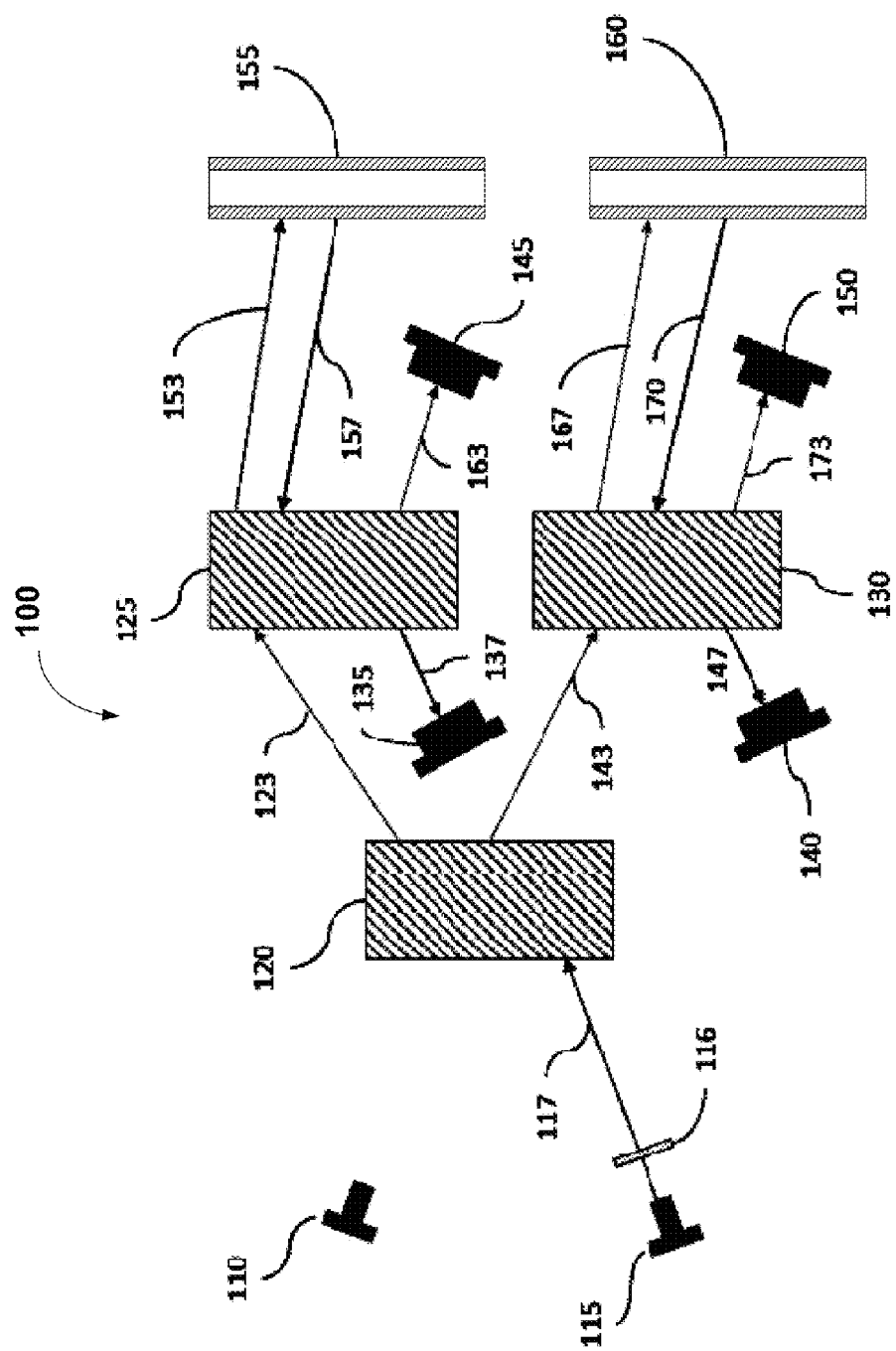
FIG. 3 is an illustrative block diagram of the EFPI sensor system 100 (as shown in FIG. 1) with the first light source 110 turned off and the second light source 115 turned on to allow monitoring and calibration of losses in the system, in accordance with an example implementation of the disclosed technology.

FIG. 3 depicts the system 100 (as shown in FIGS. 1 and 2) with the first light source 110 turned off, and the second light source 115 turned on. In accordance with an example implementation of the disclosed technology, an absolute measurement of temperature, pressure and/or acceleration can be made by properly accounting for additional losses in the system 100. These losses may include one or more of: spurious reflections from fusion joints in the optical fiber, changes in the index of refraction of the fiber as a function temperature, stress-induced changes resulting from the expansion and contraction of the optical fiber and associated mating materials as a function of temperature, and mismatches in the coefficient of thermal expansion of mating materials. To take these losses and errors into account, and in accordance with an example implantation, the first light source 110 may be turned off and the second light source 115 may be turned on as shown in FIG. 3 to measure and calibrate these changes.

According to an example implementation of the disclosed technology, the second light source 115 may be selected (or altered, for example by insertion of the coherence control components 116) to effectively emit light having a second coherence length $l_2$ that is shorter than twice the cavity lengths associated with the first EFPI sensor 155 and the second EFPI sensor 160. In accordance with an example implementation of the disclosed technology, by keeping the second coherence length $l_2$ below the round trip lengths of the optical cavities of the EFPI sensors, formation of optical interference fringes may be reduced or eliminated in the EFPI sensors and the related interference signals due to the second light source 115 may be reduced or eliminated. Without the formation of such fringes, temperature, pressure and/or acceleration-related signal changes may be eliminated and additional system losses, as referred to above, may be taken into account.

With continued reference to FIG. 3, and in accordance with an example implementation of the disclosed technology, the light in the second path 117 and emitted from the second light source 115 may be configured to pass through one or more coherence control components 116, such as frosted or ground glass to keep the second coherence length $l_2$ below a predetermined length to avoid generating interference fringes. The resulting light may enter the first optical coupler 120 and may be divided into the third path 123 the fourth path 143. In certain example implementations, the light from the third path 123 may enter the second optical coupler 125 and may be divided into the fifth path 153 and the tenth path 163. Light in the tenth path 163 may enter and be detected by the second optical detector 145. The light intensity signal measured by the second optical detector 145 may be represented as $l_{145}^{115}(\delta t_{43})$ and may be used to monitor light fluctuations originating at the second light source 115 during the measurement process. In accordance with an example implementation of the disclosed technology, the light in the fifth path 153 may continue into the second EFPI sensor 155.

Figure 4:
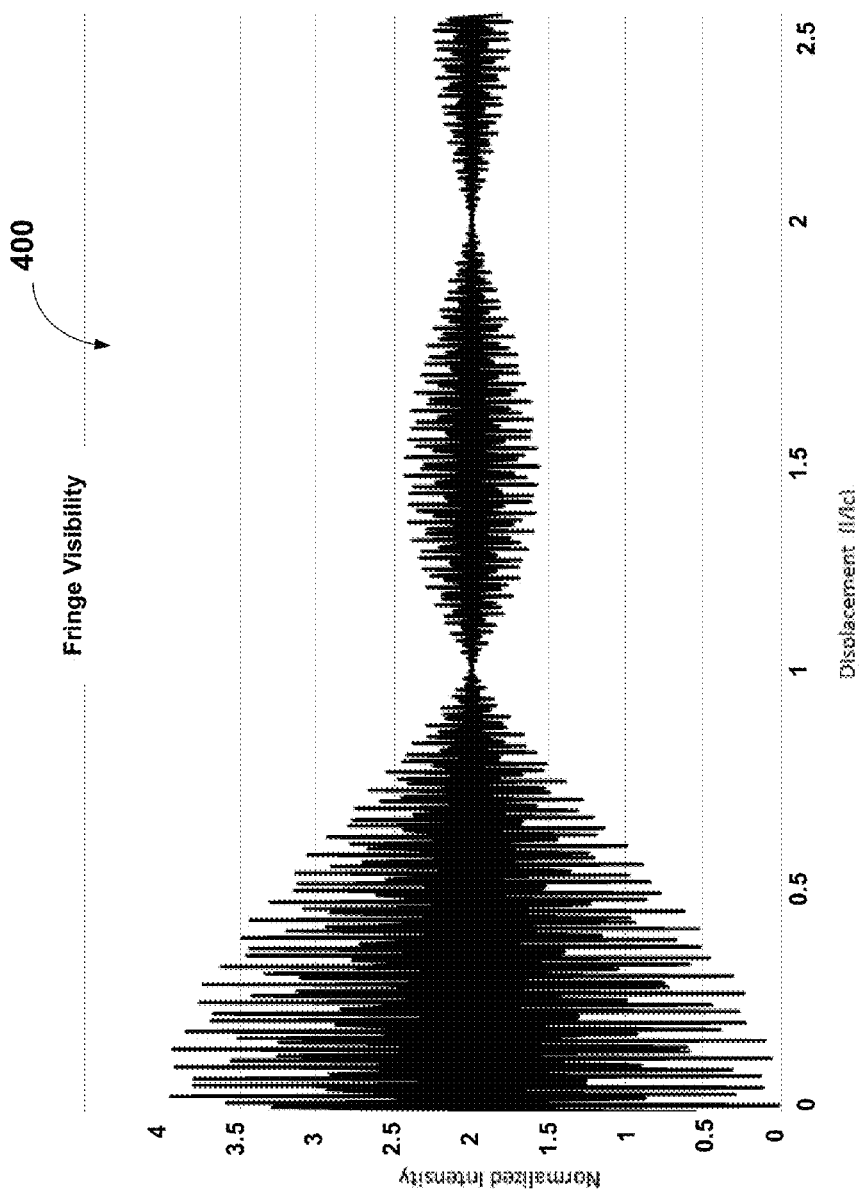
FIG. 4 is a graph depicting fringe visibility vs. spacing between the reflecting surfaces (for example, the spacing 180 between reflecting surfaces 182 184 as shown in FIG. 1) of the EFPI sensors 155 160 (as shown in FIGS. 1-3), divided by the coherence length of the second light source 115, in accordance with an example implementation of the disclosed technology.

In accordance with an example implementation, the second coherence length $l_2$ of the second light source 115 may be chosen or selectively adjusted to be approximately equal to twice the distance between the reflective surfaces of the second EFPI sensor 155 (i.e., the second cavity length 181, as depicted in FIGS. 1 and 2). In this example, a scaled and normalized representation of the fringe visibility of the light in the sixth path 157 and eighth path 170 exiting the EFPI sensors 155 160 is shown in FIG. 4. For example, FIG. 4 shows a representative plot of the fringe visibility versus the spacing (cavity length) between the reflecting surfaces in EFPI sensors divided by the coherence length of the light source 115. The fringe pattern visibility versus the ratio of twice the distance between the reflective surfaces in the EFPI sensor and the coherence length of the light source is given by:

$$I = 2I_o\left\{1 + \frac{\sin(\pi\xi)}{\pi\xi}\cos\left(\frac{2l_c\pi}{\lambda}\xi\right)\right\}$$

$$\xi = \frac{l}{l_c}$$

$$l_c = \frac{0.44\lambda^2}{\Delta\lambda}$$

As shown in FIG. 4, and although the normalized intensity is 2, the fringe visibility goes to zero when the ratio of twice the distance between the reflective surface spacing "1" in the EFPI sensors divided by the coherence length "$l_a$" of the second light source 115 is equal to one. The coherence length of the light exiting the second light source 115 can be decreased by a coherence control component 116 (such as frosted or ground glass 116) in the second path 117. This ensures that an optical interference pattern is not generated on the light in the sixth path 157 exiting the first EFPI sensor 155. In this manner, the light in the fifth path 153 entering the first EFPI sensor 155 may not be affected by the changes in the first EFPI sensor 155 resulting from changes in temperature as it may be when the first light source 110 is utilized, and as explained above with reference to FIG. 2.

In accordance with an example implementation of the disclosed technology, and with the first light source 110 off, the second light source 115 on, and the coherence control component 116 inserted; light in the sixth path 157 may include little or no optical interference pattern. Instead, light in the sixth path 157 may include intensity changes that result from one or more of: fusion splice reflections in the fiber, changes in loss of the fiber resulting from temperature changes and other imperfections that would cause intensity changes that would result in errors during the temperature measurement process.

In accordance with an example implementation of the disclosed technology, light in the sixth path 157 may enter the second optical coupler 125 and may be divided such that light in the ninth path 137 impinges on the first optical detector 135 and the intensity may be represented as $l_{135}^{115}(\delta t_{43})$. The modified intensity of light in the sixth path 157, which is the error measurement for absolute temperature, may then be registered at the first optical detector 135. Any intensity changes that occurred at the second light source 115 during the measurement process may be registered at the second optical detector 145. The percentage change of the intensity at the second optical detector 145 may be represented as $\Delta_{\%}\{l_{145}^{115}(\delta t_{43})\}$ and can be applied to the intensity measurement at the first optical detector 135 to account for the light intensity fluctuations associated with the second light source 115.

Concurrently, and in accordance with an example implementation, the light in the fourth light path 143 may exit the first optical coupler 120 at the same time as the light in the third path 123. The light in the fourth path 143 may enter the third optical coupler 130 and may be directed such that half (or a portion thereof) the light travels in the seventh path 167 and continues to the second EFPI sensor 160 while the other half (or remaining portion thereof) of the light travels in the twelfth path 173 and enters the fourth optical detector 150 where it is detected. In an example implementation, the light intensity signal measured by the fourth optical detector 150 may be represented as $l_{150}^{115}(\delta t_{43})$ and may be used to monitor light fluctuations originating at the second light source 115 during the measurement process.

In accordance with an example implementation of the disclosed technology, the light in the seventh path 167 may continue into the second EFPI sensor 160. In an example implementation, the second coherence length $l_2$ associated with the second light source 115 may be selected or altered (for example via selective insertion of the coherence control component 116) so that an optical interference pattern is not generated on the light in the eighth path 170 exiting the second EFPI sensor 160. In one example implementation, the selection or altering of the second coherence length $l_2$ associated with the second light source 115 may be implemented such that the second coherence length $l_2$ is less than twice the cavity length 181 of the second EFPI sensor 160. In certain example implementations, the second coherence length $l_2$ may be selected or adjusted to be within a range of between about 1 and about 30 microns. In certain example implementations, the second coherence length $l_2$ may be selectively adjusted to be within a range of between about 1 and about 15 microns. In certain example implementations, the second coherence length $l_2$ may be selectively adjusted to be within a range of between about 1 and about 10 microns. In certain example implementations, the second coherence length $l_2$ may be selectively adjusted to be within a range of between about 1 and about 5 microns. Therefore, the light in the seventh path 167 entering the second EFPI sensor 160 may not be affected by the changes in the second EFPI sensor 160 resulting from changes in pressure or acceleration, as it may have when the first light source 110 was utilized, as explained above with reference to FIG. 2. Accordingly, the light in the eighth path 170 may include no appreciable optical interference pattern, but instead may include intensity changes that result from one or more of: fusion splice reflections in the fiber, changes in the loss of the fiber that resulted from temperature changes and other imperfections that cause intensity changes that result in errors during the measurement process of pressure or acceleration.

In accordance with an example implementation of the disclosed technology, light in the eighth path 170 enters the third optical coupler 130 and may be directed such that light in the eleventh path 147 impinges on and is detected by the third optical detector 140. The modified intensity of light in the eighth path 170, which is the error measurement for absolute pressure or acceleration, may be registered at the third optical detector 140 and may be represented as $l_{140}^{115}(\delta t_{43})$. Thus, any intensity changes that occur in the second light source 115 during the measurement process may be registered at the fourth optical detector 150. The percentage change of the intensity at the forth optical detector 150 may be represented as $\Delta_\%\{l_{150}^{115}(\delta t_{43})\}$ and can be applied to the intensity measurement at the third optical detector 140 to account for intensity fluctuations associated with the second light source 115.

In accordance with an example implementation of the disclosed technology, the absolute temperature may be calculated by subtracting the intensity registered by the first optical detector 135 during illumination of the second light source 115 with intensity correction for the second light source 115 applied from the intensity at the first optical detector 135 during illumination by the first light source 110 with intensity correction for the first light source 110, and the result may be expressed as:

$$\{l_{135}^{110/115}(\delta t_{43,21})\}=l_{135}^{110}(\delta t_{21})*[1+\Delta_\%\{l_{145}^{110}(\delta t_{21})\}]-l_{135}^{115}(\delta t_{43})*[1+\Delta_\%\{l_{145}^{115}(\delta t_{43})\}]$$

Therefore the absolute temperature change is proportional to $\{l_{135}^{110/115}(\delta t_{43,21})\}$ and is given by $T_{abs} \propto \{l_{135}^{110/115}(\delta t_{43,21})\}$ The absolute pressure/acceleration and temperature is calculated by subtracting the intensity from the third optical detector 140 during illumination by the second light source 115 with intensity correction for the second light source 115 from the intensity at the third optical detector 140 during illumination by the first optical source 110 with intensity correction for the first optical source 110, and this result may be expressed as:

$$l_{140}^{110/115}(\delta t_{43,21})=l_{140}^{110}(\delta t_{21})*[1+\Delta_\%\{l_{150}^{110}(\delta t_{21})\}]-l_{140}^{115}(\delta t_{43})*[1+\Delta_\%\{l_{150}^{115}(\delta t_{43})\}]$$

The intensity representing the absolute pressure/acceleration is calculated by subtracting the intensity representing the absolute temperature from the intensity representing the combined absolute temperature and absolute pressure/acceleration and is given by:

$$\Delta\{l_{140/135}^{110/115}(\delta t_{43,21})\}=l_{140}^{110/115}(\delta t_{43,21})-l_{135}^{110/115}(\delta t_{43,21})$$

Therefore the absolute pressure/acceleration change is proportional to $$\Delta\{l_{140/135}^{110/115}(\delta t_{43,21})\}.$$

and is given by $$P_{abs} \propto \Delta\{l_{140/135}^{110/115}(\delta t_{43,21})\}.$$

Figure 5:
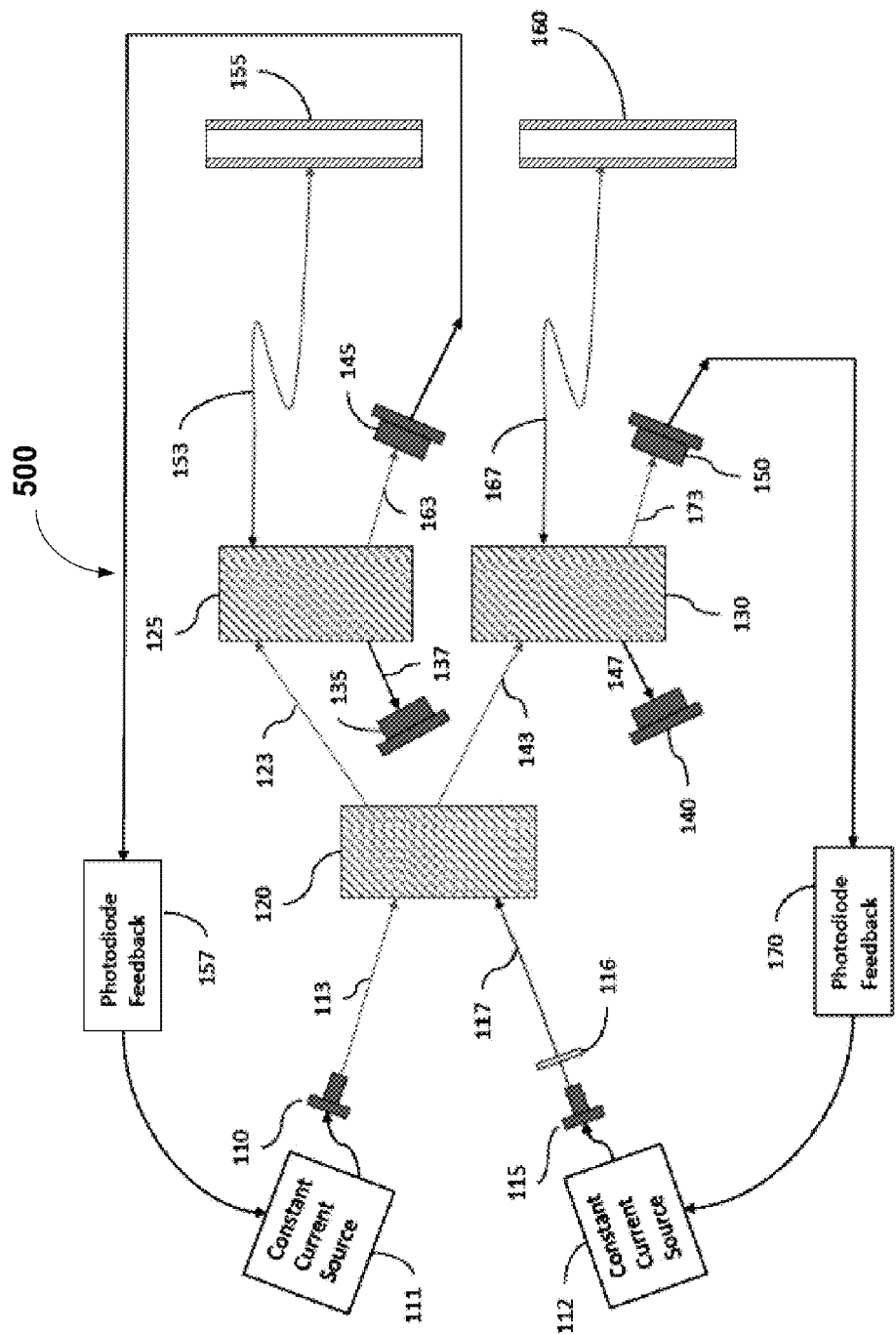
FIG. 5 is an illustrative block diagram of another EFPI sensor system 500 embodiment for controlling the intensity of the light sources 110 115 using feedback, according to an example implementation of the disclosed technology.

In accordance with an example implementation of the disclosed technology, an alternative approach for accounting for fluctuations in the first light source 110 and/or the second light source 115 during the measurement process is to control the intensity with real-time feedback. A representation of such a system 500 is depicted in FIG. 5. Instead of subtracting out the intensity fluctuations of the first light source 110 and/or the second light source 115, the intensity measurements at the second optical detector 145 and the fourth optical detector 150 may be used to control the electrical current flowing to the first light source 110 and/or the second light source 115. For example, when the first light source 110 is on and the second light source 115 is off, the intensity of the first light source 110 may be measured by the second optical detector 145. Any fluctuations in the light intensity may measured and sent as an electrical signal to the first photodiode feedback unit 157. In an example implementation, the first photodiode feedback unit 157 may convert the changes in electrical signals coming from the second optical detector 145 to a change in current to the constant current source for driving the first optical source 110. In an example implementation, the feedback loop may correct and stabilize the light intensity being emitted by the first light source 110. Similarly, when the second light source 115 is on and the first light source 110 is off, the intensity of the second light source 115 may be measured by the fourth optical detector 150. Any fluctuations in this light intensity may be measured and sent as an electrical signal to the second photodiode feedback unit 170. This second photodiode feedback unit 170 may convert the changes in electrical signals coming from the fourth optical detector 150 to a change in current to a constant current source for driving the second optical source 115. In an example implementation, this feedback loop may correct and stabilize the light intensity being emitted by the second light source 115. In accordance with an example implementation, the remaining system 500 may operate in a manner as previously described with respect to FIGS. 1-3.

Figure 6:
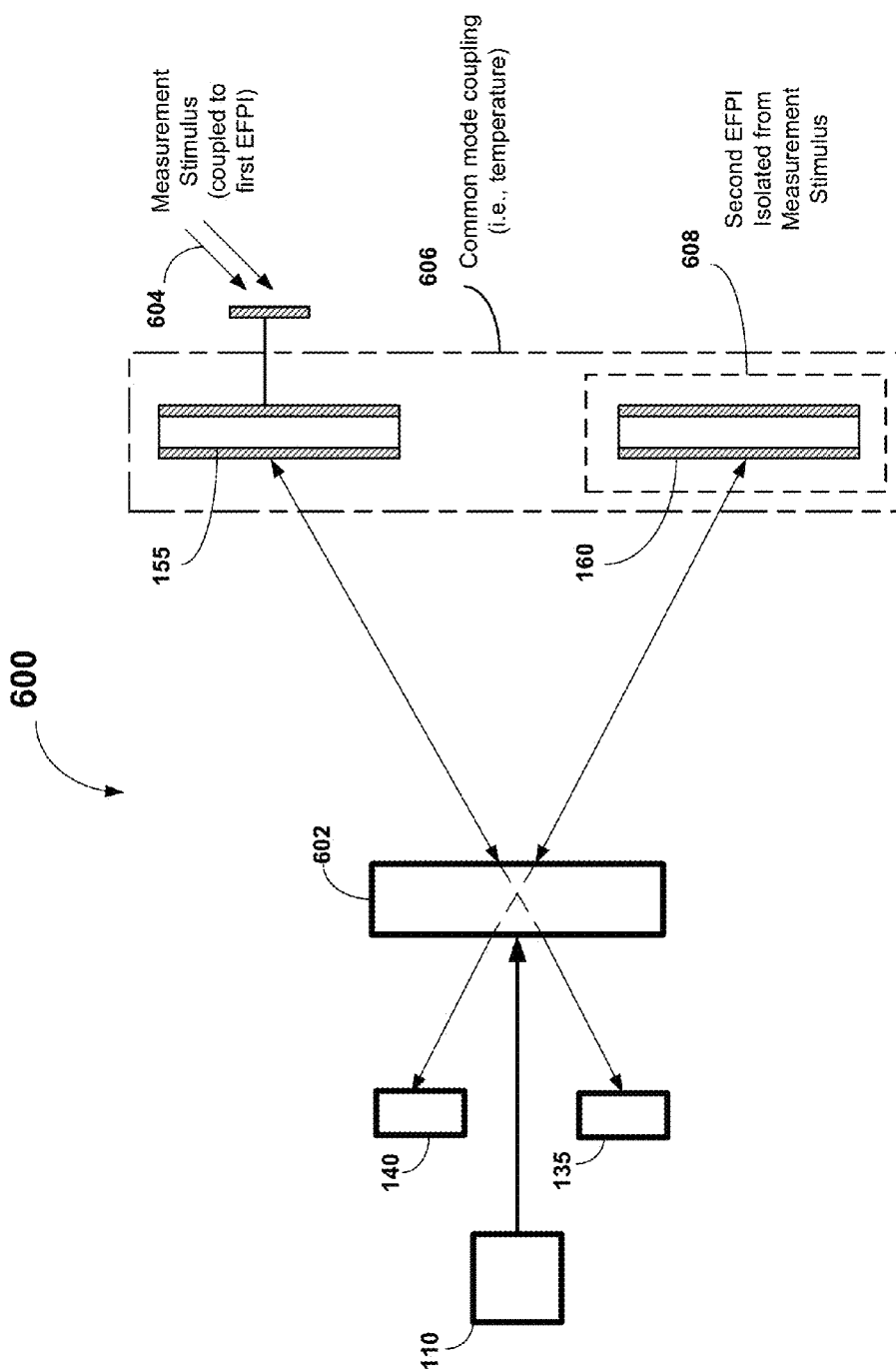
FIG. 6 is an illustrative an generalized block diagram of an EFPI sensor system 600 embodiment according to an example implementation of the disclosed technology.

FIG. 6 depicts a simplified and generalized block diagram of an EFPI sensor system 600 embodiment according to an example implementation of the disclosed technology. In this implementation, and as may apply to other example implementations as previously discussed, a desired measurement stimulus 604 may be coupled to the first EFPI sensor 155, but the second EFPI sensor 160 may be configured such that it is at least partially isolated 608 from the desired measurement stimulus 604 that acts on the first EFPI 155. In accordance with an example implementation of the disclosed technology, isolating 608 the second EFPI sensor in this regard may be accomplished by configuring the optical cavity and associated reflective surfaces of the second EFPI sensor 160 such that coupling with the external forces (desired measurement stimulus 604) is minimized or eliminated altogether.

As may be apparent to those having skill in the art, certain unwanted stimulus (such as thermal effects, etc.) may affect both the first EFPI sensor 155 and the second EFPI sensor 160, and such common stimuli may be difficult to isolate so that they affect only one EFPI sensor. According to an example implementation, the first EFPI sensor 155 and the second EFPI sensor 160 may be configured for common mode coupling 606, (such as thermal coupling) so that signals arising from such common mode coupling 606 affect both EFPI sensors. In certain example implementations, the signals arising from such common mode coupling 606 may be rejected or subtracted from the signals corresponding to desired measurement stimulus 604 that are measured by the first EFPI sensor 155.

With continued reference to FIG. 6, a generalized coupler 602 is depicted, and according to an example implementation, may represent one or more of the first optical coupler 120 second optical coupler 125, and/or third optical coupler 130 as previously discussed with reference to FIGS. 1-3, and FIG. 5. In other example implementations, the coupler 602 may be embodied in various other configurations, as known to those having skill in the art, without departing from the scope of the disclosed technology. In certain example implementations, the coupler 602 may be configured to receive input light from one or more light sources, such as the first light source 110. In certain example implementations, the coupler 602 may split the input light into at least two paths for interrogating the first EFPI sensor 155 and the second EFPI sensor 160. As previously discussed, the light returned from the first EFPI sensor 155 may include a component due to measurement stimulus 604 and a component due to the common mode stimulus, while the light returned from the second EFPI sensor 160 may (predominantly) include just the common mode component. These light signals may be coupled to respective optical detectors 135 140 via the coupler 602 and the resulting signals may be further processed, for example, to subtract out the common mode signals (such as due to temperature).

It should be readily apparent from the previous discussions involving FIGS. 1-5, that additional light sources, detectors, couplers, coherence control components, etc. may be added, removed, utilized, etc., to further compensate for the other various system imperfections and undesired effects.

Figure 7:
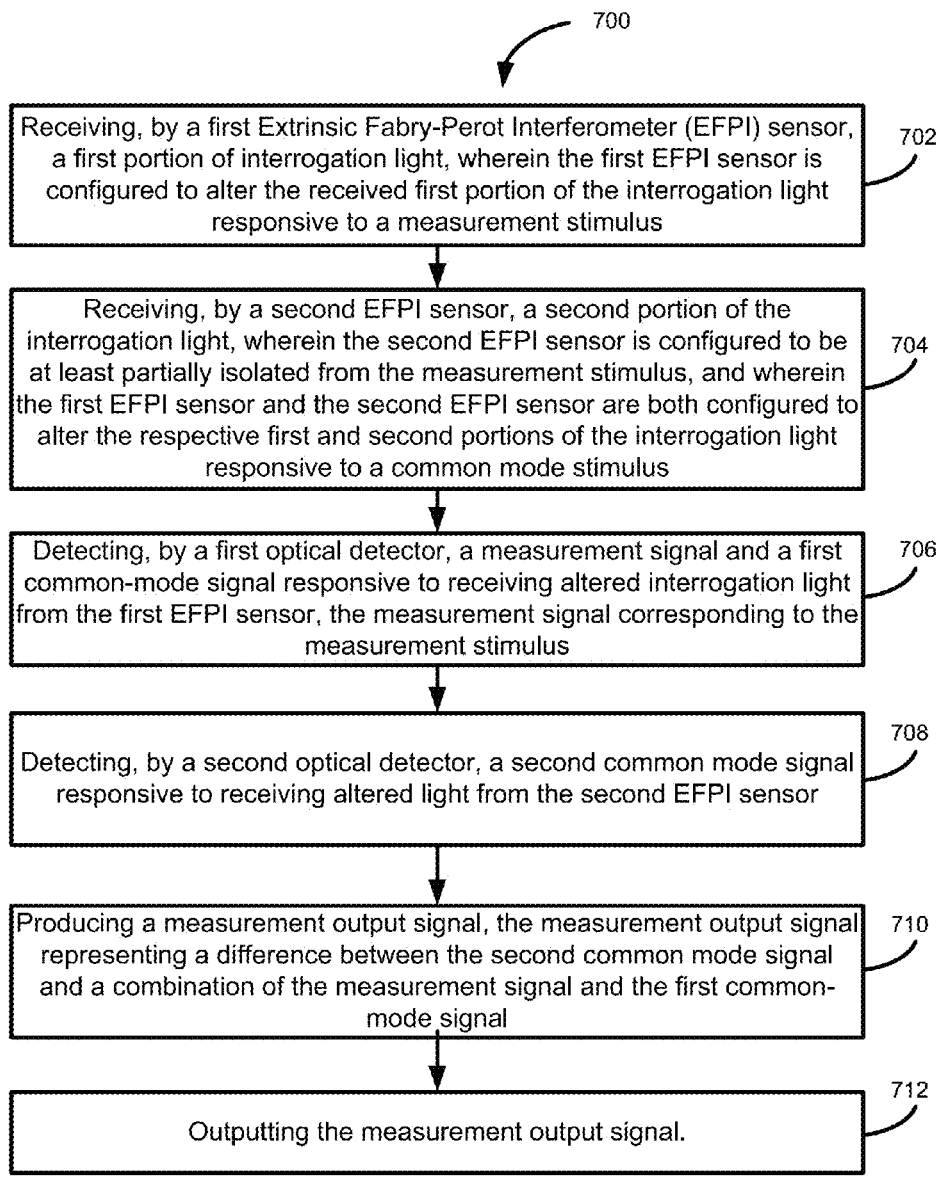
FIG. 7 is a flow diagram of a method 700 according to an example implementation of the disclosed technology.

FIG. 7 is a flow diagram of a method 700 according to an example implementation of the disclosed technology. In block 702, the method 700 includes receiving, by a first Extrinsic Fabry-Perot Interferometer (EFPI) sensor, a first portion of interrogation light, wherein the first EFPI sensor is configured to alter the received first portion of the interrogation light responsive to a measurement stimulus. In block 704, the method 700 includes receiving, by a second EFPI sensor, a second portion of the interrogation light, wherein the second EFPI sensor is configured to be at least partially isolated from the measurement stimulus, and wherein the first EFPI sensor and the second EFPI sensor are both configured to alter the respective first and second portions of the interrogation light responsive to a common mode stimulus. In block 706, the method 700 includes detecting, by a first optical detector, a measurement signal and a first common-mode signal responsive to receiving altered interrogation light from the first EFPI sensor, the measurement signal corresponding to the measurement stimulus. In block 708, the method 700 includes detecting, by a second optical detector, a second common mode signal responsive to receiving altered light from the second EFPI sensor. In block 710, the method 700 includes producing a measurement output signal, the measurement output signal representing a difference between the second common mode signal and a combination of the measurement signal and the first common-mode signal. In block 712, the method 700 includes outputting the measurement output signal.

Certain example implementations can include detecting, by a third optical detector, an intensity variation signal of a third portion of the interrogation light and compensating the measurement output signal with the intensity variation signal or controlling the interrogation light with the intensity variation signal.

Certain example implementations can include receiving, by one or more of the first EFPI sensor and the second EFPI sensor, a second portion of system probe light, wherein the system probe light is characterized by a second coherence length $l_2$ that is less than twice a cavity length of the first EFPI sensor and is also less than twice a cavity length of the second EFPI sensor such that interference fringes are not produced in the first EFPI sensor or the second EFPI sensor. An example implementation may include detecting, by one or more optical detectors, one or more system probe signals in communication with one or more of the first EFPI sensor, the second EFPI sensor, and at least one intervening optical fiber section or optical fiber splice; and compensating the measurement output signal with the one or more system probe signals.

In certain example implementations, the system probe signals include one or more intensity variations or losses due to one or more of reflections in the at least one intervening optical fiber splice and losses of the least one intervening optical fiber section.

An example implementation of the disclosed technology may further include detecting, by a fourth optical detector, an intensity variation signal in a portion of one or more of the interrogation light (for example, from a first light source) and the system probe light (for example, from the second light source), and compensating the measurement output signal or controlling the interrogation light and/or the system probe light with the intensity variation signal.

In certain example implementations, the second common mode signal is substantially equivalent to the first common mode signal. In an example implementation, the measurement stimulus comprises one or more of pressure, acceleration, vibration, and force. In an example implementation, the common mode stimulus may include a thermal stimulus. In an example implementation, the common mode stimulus may include an acceleration stimulus.

In certain example implementations, one or more of the first light source, the second light source and/or the system probe light may be selectively controlled.

In certain example implementations, the second coherence length $l_2$ may be selectively controlled.

Definitions and Equations

Time "$t_1$": First Light Source 110 On/Second Light Source 115 Off $l_{145}^{110}(t_1)$=Intensity measurement of first light source 110 through optical couplers 120 and 125 measured at photodetector 145 (i.e., the second optical detector) at time $t_1$.

$l_{135}^{110}(t_1)$=Intensity measurement of first light source 110 through optical couplers 120 and 130 measured at photodetector 150 at time $t_1$.

$l_{135}^{110}(t_1)$=Fringe intensity measurement from Fabry-Perot sensor 155 (i.e., the first EFPI sensor) at photodetector 135 (i.e., the first optical detector) for temperature/reference measurement at time $t_1$.

$l_{140}^{110}(t_1)$=Fringe intensity measurement from Fabry-Perot sensor 160 at photodetector 140 for pressure measurement at time $t_1$.

Time "$t_2$": First Light Source 110 On/Second Light Source 115 Off $l_{145}^{110}(t_2)$=Intensity measurement of first light source 110 through optical couplers 120 and 125 measured at photodetector 145 at time $t_2$.

$l_{140}^{110}(t_2)$=Intensity measurement of first light source 110 through optical couplers 120 and 130 measured at photodetector 150 at time $t_2$.

$l_{135}^{110}(t_2)$=Fringe intensity measurement from Fabry-Perot sensor 155 at photodetector 135 for temperature/reference measurement at time $t_2$.

$l_{140}^{110}(t_2)$=Fringe intensity measurement from Fabry-Perot sensor 160 at photodetector 140 for pressure measurement at time $t_2$.

$l_{140}^{110}(\delta t_{21})=l_{135}^{110}(t_2)-l_{135}^{110}(t_1)$=The change in the fringe intensity measurement from Fabry-Perot sensor 155 at photodetector 135 from $t_1$ to $t_2$.

$l_{145}^{110}(\delta t_{21})=l_{145}^{110}(t_2)-l_{145}^{110}(t_1)$=The change in the output intensity of first light source 110 during the measurement of $l_{135}^{110}(\delta t_{21})$.

$l_{140}^{110}(\delta t_{21})=l_{140}^{110}(t_2)-l_{140}^{110}(t_1)$=The change in the fringe intensity measurement from Fabry-Perot sensor 160 at photodetector 140 from $t_1$ to $t_2$.

$l_{150}^{110}(\delta t_{21})=l_{150}^{110}(t_2)-l_{150}^{110}(t_1)$=The change in the output intensity of first light source 110 during the measurement of $l_{150}^{110}(\delta t_{21})$.

Time "$t_3$": Second Light Source 115 on/First Light Source 110 Off $l_{145}^{115}(t_3)$=Intensity measurement of second light source 115 through optical couplers 120 and 125 measured at photodetector 145 at time $t_3$.

$l_{150}^{115}(t_3)$≡Intensity measurement of second light source 115 through optical couplers 120 and 130 measured at photodetector 150 at time $t_3$.

$l_{135}^{115}(t_3)$≡Intensity measurement from Fabry-Perot sensor 155 with no optical interference at photodetector 135 for system loss measurement at time $t_3$.

$l_{140}^{115}(t_3)$≡Intensity measurement from Fabry-Perot 160 with no optical interference at photodetector 140 for system loss measurement at time $t_3$.

Time "$t_4$": Second Light Source 115 on/First Light Source 110 Off $l_{145}^{115}(t_4)$≡Intensity measurement of second light source 115 through optical couplers 120 and 125 measured at photodetector 145 at time $t_4$.

$l_{150}^{115}(t_4)$≡Intensity measurement of second light source 115 through optical couplers 120 and 130 measured at photodetector 150 at time $t_4$.

$l_{135}^{115}(t_4)$≡Intensity measurement from Fabry-Perot sensor 155 with no optical interference at photodetector 135 for system loss measurement at time $t_4$.

$l_{140}^{115}(t_4)$≡Intensity measurement from Fabry-Perot sensor 160 with no optical interference at photodetector 140 for system loss measurement at time $t_4$.

$l_{150}^{115}(\delta t_{43}) = l_{150}^{115}(t_4) - l_{150}^{115}(t_3) \equiv$ The change in the output intensity of second light source 115 during the measurement of $l_{150}^{115}(\delta t_{43})$.

$l_{135}^{115}(\delta t_{43}) = l_{135}^{115}(t_4) - l_{135}^{115}(t_3) \equiv$ The change in the intensity measurement from Fabry-Perot sensor 155 at photodetector 135 with no optical interference from $t_3$ to $t_4$.

$l_{145}^{115}(\delta t_{43}) = l_{145}^{115}(t_4) - l_{145}^{115}(t_3) \equiv$ The change in the output intensity of second light source 115 during the measurement of $l_{pd1}^{115}(\delta t_{43})$.

$l_{140}^{115}(\delta t_{43}) = l_{140}^{115}(t_4) - l_{140}^{115}(t_3) \equiv$ The change in the intensity measurement from Fabry-Perot sensor 160 at photodetector 140 with no optical interference from $t_3$ to $t_4$.

Measurement Analysis

The percentage change in intensity of first light source 110 from $t_1$ to $t_2$:

$$\frac{I_{150}^{110}(\delta t_{21})}{I_{150}^{110}(t_1)} = \Delta_\%\{I_{150}^{110}(\delta t_{21})\}$$

$$\frac{I_{145}^{110}(\delta t_{21})}{I_{145}^{110}(t_1)} = \Delta_\%\{I_{145}^{110}(\delta t_{21})\}$$

Since Fabry-Perot sensor 155 is exposed to temperature changes and no pressure changes and Fabry-Perot sensor 160 is exposed to both temperature changes and pressure changes, the pressure can be calculated by subtracting the fringe intensity measurement at Fabry-Perot sensor 160 from the fringe intensity measurement from Fabry-Perot sensor 155 and correcting for intensity fluctuations at light source 110:

$$\Delta\{l_{140/135}^{110}(\delta t_{21})\} = l_{140}^{110}(\delta t_{21})*[1+\Delta_\%\{l_{150}^{110}(\delta t_{21})\}] - l_{135}^{110}(\delta t_{21})*[1+\Delta_\%\{l_{145}^{110}(\delta t_{21})\}]$$

The relative pressure change from $t_1$ to $t_2$ "$p_{rel}$" is proportional to $\Delta\{l_{140/135}^{110}(\delta t_{21})\}$.

$$p_{rel} \propto \Delta\{l_{140/135}^{110}(\delta t_{21})\}$$

The percentage change in intensity of second light source 115 from $t_3$ to $t_4$:

$$\frac{I_{150}^{115}(\delta t_{43})}{I_{150}^{115}(t_3)} = \Delta_\%\{I_{150}^{115}(\delta t_{43})\}$$

$$\frac{I_{145}^{115}(\delta t_{43})}{I_{145}^{115}(t_3)} = \Delta_\%\{I_{145}^{115}(\delta t_{43})\}$$

The absolute temperature is calculated by subtracting the intensity from photodetector 135 during illumination by second light source 115 with intensity correction for second light source 115 from the intensity at photodetector 135 during illumination by first light source 110 with intensity correction for light source 110.

$$\{l_{135}^{110/115}(\delta t_{43,21})\} = l_{135}^{110}(\delta t_{21})*[1+\Delta_\%\{l_{145}^{110}(\delta t_{21})\}] - l_{135}^{115}(\delta t_{43})*[1+\Delta_\%\{l_{145}^{115}(\delta t_{43})\}]$$

The absolute temperature is proportional to $$\{l_{135}^{110/115}(\delta t_{43,21})\}$$

$$T \propto \{l_{135}^{110/115}(\delta t_{43,21})\}$$

The absolute pressure/acceleration and temperature is calculated by subtracting the intensity from photodetector 140 during illumination by second light source 115 with intensity correction for second light source 115 from the intensity at photodetector 135 during illumination by first light source 110 with intensity correction for light source 110.

The combined intensity representing the absolute pressure/acceleration and temperature is:

$$l_{140}^{110/115}(\delta t_{43,21}) = l_{140}^{110}(\delta t_{21})*[1+\Delta_\%\{l_{150}^{110}(\delta t_{21})\}] - l_{140}^{115}(\delta t_{43})*[1+\Delta_\%\{l_{150}^{115}(\delta t_{43})\}]$$

The intensity representing the absolute pressure/acceleration is given by subtracting the intensity representing the absolute temperature from the intensity representing the combined absolute temperature and absolute pressure/acceleration.

$$\Delta\{l_{140/135}^{110/115}(\delta t_{43,21})\} = l_{140}^{110/115}(\delta t_{43,21}) - l_{135}^{110/115}(\delta t_{43,21})$$

The absolute pressure/acceleration is proportional to $\Delta\{l_{140/135}^{110/115}(\delta t_{43,21})\}$:

$$p_{abs} \propto \Delta\{l_{140/135}^{110/115}(\delta t_{43,21})\}$$

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method comprising:
receiving, by a first Extrinsic Fabry-Perot Interferometer (EFPI) sensor, a first portion of interrogation light, wherein the first EPFI sensor is configured to alter the received first portion of the interrogation light responsive to a measurement stimulus comprising one or more of pressure, acceleration, vibration, and force;
receiving, by a second EPFI sensor, a second portion of the interrogation light, wherein the second EPFI sensor is configured to be at least partially mechanically isolated from the measurement stimulus, and wherein the first EPFI sensor and the second EPFI sensor are both configured to alter the respective first and second portions of the interrogation light responsive to a common mode stimulus;
receiving, by one or more of the first EPFI sensor and the second EPFI sensor, a first portion of system probe light, wherein the system probe light is characterized by a second coherence length $l_2$ that is less than twice a cavity length of the first EPFI sensor and is also less than twice a cavity length of the second EPFI sensor such that interference fringes are reduced in the first EPFI sensor or the second EPFI sensor;
detecting, by one or more optical detectors, one or more system probe signals in communication with one or more of the first EPFI sensor and the second EPFI sensor, and at least one intervening optical fiber section or optical fiber splice;
detecting, by a first optical detector, a measurement signal and a first common-mode signal responsive to receiving altered interrogation light from the first EPFI sensor, the measurement signal corresponding to the measurement stimulus;
detecting, by a second optical detector, a second common mode signal responsive to receiving altered light from the second EPFI sensor;
producing a measurement output signal, the measurement output signal representing a difference between the second common mode signal and a combination of the measurement signal and the first common-mode signal;
compensating the measurement output signal with a compensation signal derived from the one or more system probe signals; and
outputting the compensated measurement output signal.

2. The method of claim 1, further comprising:
detecting, by a third optical detector, an intensity variation signal of a third portion of the interrogation light; and
compensating the measurement output signal with the intensity variation signal or controlling the interrogation light with the intensity variation signal.

3. The method of claim 1, wherein the one or more system probe signals comprise one or more losses due to one or more of reflections in the at least one intervening optical fiber splice and losses of the least one intervening optical fiber section.

4. The method of claim 1, further comprising:
detecting, by a fourth optical detector, an intensity variation signal in a portion of one or more of the interrogation light and the system probe light; and
compensating the measurement output signal or controlling the interrogation light or the system probe light with the intensity variation signal.

5. The method of claim 1 wherein the second common mode signal is substantially equivalent to the first common mode signal.

6. The method of claim 1, wherein the common mode stimulus comprises a thermal stimulus.

7. The method of claim 1, wherein the common mode stimulus comprises an acceleration stimulus.

8. The method of claim 1, wherein the interrogation light is provided by a first light source, and wherein the interrogation light is selectively controlled.

9. The method of claim 1, wherein the system probe light is provided by a second light source, and wherein the system probe light is selectively controlled.

10. The method of claim 1, wherein the second coherence length is selectively controlled.

11. A system comprising:
a first Extrinsic Fabry-Perot Interferometer (EFPI) sensor configured to receive a first portion of interrogation light, the first EPFI sensor further configured to alter the first portion of the received interrogation light responsive to a measurement stimulus and a common mode stimulus in communication with the system;
a second EPFI sensor configured to be at least partially mechanically isolated from the measurement stimulus, the second EPFI sensor configured to receive a second portion of the interrogation light, the second EPFI sensor further configured to alter the second portion of the received interrogation light responsive to the common mode stimulus, wherein the measurement stimulus comprises one or more of pressure, acceleration, vibration, and force;
a first optical detector configured to receive altered light from the first EPFI and to produce a combined measurement signal and first common-mode signal responsive to receiving the altered light from the first EPFI, the measurement signal corresponding to the measurement stimulus;
a second optical detector configured to receive altered light from the second EPFI and to produce a second common mode signal responsive to receiving the altered light from the second EPFI;
a third optical detector configured to detect one or more system probe signals responsive to detection of system probe light;
a coherence control component in communication with the third optical detector, wherein the coherence control component is configured to control a coherence length of the system probe light such that interference fringes are reduced in the first EPFI sensor or the second EPFI sensor;

at least one electronic component configured to produce a measurement output signal, the measurement output signal comprising a difference between the second common mode signal and the combined measurement signal and first common-mode signal, and wherein the at least one electronic component is configured to compensate the measurement output signal based on the one or more system probe signals.

12. The system of claim 11, wherein the third optical detector is configured to produce an intensity variation signal responsive to receiving a third portion of the interrogation light, and wherein the at least one electronic component is further configured with feedback to compensate the measurement output signal with the intensity variation signal or to control the interrogation light with the intensity variation signal.

13. The system of claim 11, wherein the one or more system probe signals comprise one or more of losses due to one or more of the at least one optical fiber section and the optical fiber splice.

14. The system of claim 11, further comprising a fourth optical detector configured to detect an intensity variation signal in a portion of one or more of the interrogation light and the system probe light; and wherein the at least one electronic component is further configured to compensate the measurement output signal or control the interrogation light based on the intensity variation signal.

15. The system of claim 11, wherein the first EPFI sensor and the second EPFI sensor are further configured to alter the respective first portion and second portion of the received interrogation light responsive to the common mode stimulus, wherein the common mode stimulus comprises a thermal stimulus.

16. The system of claim 11, further comprising an interrogation light source, wherein the interrogation light source is configured to be selectively controlled.

17. The system of claim 11, further comprising a system probe light source, wherein the system probe light source is configured to be selectively controlled.

18. The system of claim 11, further comprising at least one light emitting diode for producing one or more of interrogation light and system probe light.

19. The system of claim 11, further comprising one or more couplers and one or more optical fiber sections for guiding light from a light source to one or more of the first EFPI sensor and the second EPFI sensor.

* * * * *